United States Patent Office 3,436,407
Patented Apr. 1, 1969

3,436,407
HYDROXYFLAVIN 3,4-DIOLS, A METHOD OF PRODUCING THEM AND MEDICAMENT BASED THEREON
Jacques Masquelier, Bordeaux, France, assignor to Societe Civile de Recherche Pharmaceutique et Therapeutique, Bordeaux Gironde, France, a corporation of France
No Drawing. Filed Dec. 10, 1965, Ser. No. 513,118
Claims priority, application France, Dec. 14, 1964, 998,508
Int. Cl. C07d 7/24; A61k 27/00
U.S. Cl. 260—345.2          12 Claims

ABSTRACT OF THE DISCLOSURE

Hydroxyflavan 3,4-diols or leucoanthocyans are extracted in isolated but undergraded condition comprising the less polymerized forms of the hydroxyflavan 3,4-diols comprising, in particular, the monomer, the dimers, trimers, tetramers, and pentamers, while eliminating the more condensed forms ranging from tannin to phlobaphene, by successive stages of elimination of impurities. The compounds are active elements of a bioflavanoid or vitamin P factor, effective in the treatment of venous, vascular, and capillary diseases.

---

The present invention relates to hydroxyflavan 3,4-diols, a method of producing them, and to medicaments based thereon.

In particular, the present invention has as object a method for the extraction of hydroxyflavan 3,4-diols or leucoanthocyans from certain vegetable substances, and relates to tetrahydroxy 5,7,3′,4′-flavan 3,4-diol, a new compound of the formula:

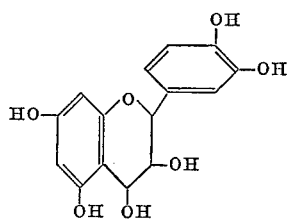

The invention likewise relates to this lastmentioned compound as an active element of a bioflavanoid or vitamin P factor, which is effective in the treatment of venous, vascular, and capillary diseases. This compound is an amorphous powder of light beige colour, odourless, very soluble in water, and soluble in methanol, ethanol, acetone and ethyl acetate, but insoluble in ether, petroleum ether, benzene and chloroform.

Processes for the extraction of hydroxyflavan 3,4-diols from groundnuts and pine bark have already been described, particularly in French patent specifications Nos. 968,589 and 1,036,922. In these known processes use is first made of an organic solvent which dissolves all the polyphenols of the drug. Undesirable substances are then eliminated either by selective solvation or by adsorption followed by elution. Finally, the product is purified by successive solvation and precipitation. It is known at the present time that because of their excessive duration and of the nature of the solvents used such methods of extraction entail the degradation of the hydroxyflavan 3,4-diols.

The present invention has essentially as object a process of extraction of hydroxyflavan 3,4-diols which enables these substances to be obtained undegraded. In plants the hydroxyflavan 3,4-diols exist in the form of complex mixtures, including all degrees of polymerisation ranging from monomers to condensed polymers of the phlobaphene type, and the process according to the invention has the advantage of isolating the less polymerised forms of the hydroxyflavan 3,4-diols, comprising in particular the monomer, the dimers, trimers, tetramers, and pentamers. Moreover, the process according to the invention eliminates the more condensed forms, ranging from tannin to phlobaphene.

The process according to the invention comprises the steps of: treating vegetable material such as groundnuts or pine bark with an aqueous solution of sodium chloride; separating the resulting aqueous solution from the solid impurities; extracting said aqueous solution with ethyl acetate to obtain a solution of hydroxyflavan 3,4-diols in ethyl acetate; treating said solution in ethyl acetate with an excess of chloroform; separating the precipitated hydroxyflavan 3,4-diols; purifying said hydroxyflavan 3,4-diols by a plurality of stages each consisting of solution in ethyl acetate followed by precipitation from solution by addition of chloroform.

The hydroxy flavan 3,4-diols have the following general formula:

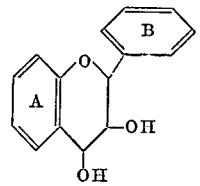

where rings A and/or B are substituted with one or more hydroxy-groups. The preferred compound is tetrahydroxy 5,7,3′,4′-flavan 3,4-diol, having the formula:

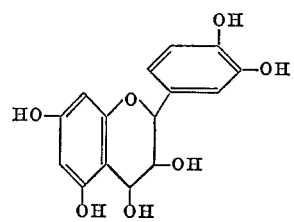

In the process of the invention, the raw vegetable material is first subjected to extraction with the aqueous solution, preferably saturated, of sodium chloride. Depending on the nature of the raw material, this extraction may be carried out in the cold or, for example, at a temperature of about 100° C. The digestion time obviously varies according to the temperature at which the vegetable material is treated. In particular it is of the order of one hour if the temperature is close to 100° C. It must be noted that the drug may first be freed of lipids or treated with an organic liquid which eliminates undesirable impurities, provided that this solvent neither entrains the hydroxyflavan 3,4-diols nor degrades them. The extraction of the raw vegetable material may in fact also be effected by means of an organic solvent, preferably an alcohol, such as methanol, ethanol, or isopropanol. In this case the initial organic solvent is then driven off by evaporation at reduced pressure, after which the residue is taken up in water saturated with sodium chloride, thus obtaining an aqueous solution which is then subjected to the further treatment according to the invention.

The sodium chloride solution, clarified by filtration, centrifuging, or other separation process, is then extracted with ethyl acetate, which dissolved the hydroxyflavan 3,4-diols. The ethyl acetate is then dried, for example by shaking with anhydrous sodium sulphate, or with any other substance retaining the water containing in the reaction medium. If necessary, the dried ethyl acetate is then concentrated under reduced pressure, for example to about ⅕ of its original volume.

The concentrated ethyl acetate is then treated with an excess of chloroform which precipitates the hydroxyflavan 3,4-diols, while the impurities remain dissolved.

The precipitate collected by decanting, filtration, centrifuging, or any other means enabling the mother liquors to be eliminated is redissolved in ethyl acetate. This solution is filtered and a considerable excess of chloroform added to the filtrate, thus making the hydroxy-flavan 3,4-diols insoluble. These operations may be repeated until the substance is chromatographically pure. The final product, obtained in the amorphous state, is soluble in water, alcohol, ethyl acetate, and acetone, and is insoluble in chloroform, ether, benzene, hexane, and petroleum ether.

It will be recalled that all the bioflavanoids are most frequently found in barks, such as maritime pine barks, teguments, cuticles, and the ligneous parts of plants, and that the hydroxyflavan diols exhibit in plants a spontaneous tendency to collect as voluminous aggregates; as only isolated molecules or aggregates of small dimensions have intensive vitamin P activity it is therefore desirable to verify the purity of the product obtained by the process according to the invention. This may advantageously be done by two dimensional paper-chromatography of the product, for example with isobutanol saturated with water as solvent for the first dimension and with a 2% acetic acid solution as solvent for the second dimension, the chromatogram being developed with Ehrlich's reagent. Under these conditions the physiologically active substances must migrate in the second dimension. If impurities (aggregates of high molecular weight) exist, they remain on the first path and are therefore easily detectable. This process makes it possible to obtain the product of the process according to the invention in a chromatographically pure form, as experience has shown.

Determination of the compound mentioned is facilitated by a highly specific reaction when treated with a warm dilute mineral acid, the hydroxyflavan 3,4-diol is converted into anthocyanidol, a pigment with an intense red colour. A colorimetric method is thus available by which a determination which is both sensitive (0.005 mg. hydroxyflavan 3,4-diol per ml.) and specific may be effected. No other substance can be converted into anthocyanidol under the conditions of the determination.

In an ethanol solution (1 part per 100,000) the compound of the above formula has maximum absorption in ultraviolet at 280 millimicrons; the addition of a trace of sodium hydroxide produces a characteristic movement of this maximum towards the long wavelengths, at 285 millimicrons. With the additon of catechol under the same conditions the maximum is displaced from 280 to 295 millimicrons, which permits differentiation between these two substances, although they are very closely related.

One example of performance of the method of the invention is described below by way of illustration and without limitation.

EXAMPLE 1 kg. of maritime pine bark was subjected to two successive digestions at 100° C. for a period of 30 minutes in each case, in 3 litres of water saturated with sodium chloride. After each digestion the resulting powder was drained and washed with 0.5 litre of saturated sodium chloride solution. The filtrates and the washing waters were combined and constituted solution A.

Solution A was extracted with five successive portions of 250 ml. of ethyl acetate. The ethyl acetate was collected directly on 200 g. of anhydrous sodium sulphate. The product was filtered and the filtrate then evaporated at a reduced pressure to ⅕ of its original volume. The concentrated ethyl acetate was then poured with agitation into two litres of chloroform. The precipitate was collected by filtration, after which it was dissolved in 100 ml. of ethyl acetate and again precipitated by pouring this solution into 1 litre of chloroform. This operation was repeated a second time, with the same volumes of solvents.

The chloroform impregnating the precipitate was eliminated by heating under reduced pressure in a vacuum stove, without exceeding 50° C.

About 5 grams of pure product were obtained in this manner.

The extraction process described above may undergo numerous modifications. In the first place, the saturated aqueous sodium chloride may be replaced by another saline solution having the property of dissolving only the nonpolymerised forms of the hydroxyflavan 3,4-diols. The extraction may also be effected by means of water alone and the resulting solution then saturated with a suitable electrolyte, followed by filtration or centrifuging to eliminate insoluble matter.

Similarly, ethyl acetate may be replaced by acetone or generally by any solvent or mixture of solvents having the property of dissolving only the non-polymerised forms of the hydroxyflavan 3,4-diols without denaturing them.

The organic solution of the hydroxyflavan 3,4-diols may also be treated, apart from chloroform, with any other solvent or mixture of solvents rendering the desired substance insoluble without degrading it and leaving the impurities dissolved, particularly ether or saturated hydrocarbons, such as hexane, or aromatic hydrocarbons, such as benzene.

Finally, the final purification may comprise a larger number of operations of solution and precipitation with the aid of various solvents and flocculating agents; it may also be effected by chromatography on a column, by adsorption followed by elution, or by any other process avoiding degradation.

Like hydroxyflavan diols in general, the pure product obtained is prefectly tolerated when administered orally. In the mouse, the D.L. 50 lies at 3 g. per kg. per os, which excludes any risk of acute or chronic intoxication, therapeutic doses being on the average 20,000 times smaller.

The therapeutic indications of tetrahydroxy 5,7,3',4'-flavan 3,4-diol are those of the bioflavanoids or vitamin P factors in general, that is to say for the treatment of the under-mentioned disorders or diseases.

I.—Capillary fragility

Tendency to ecchymosis;
Vascular disorders in cases of hypertension;
Diabetic retinopathy;
Capillary fragility of renal insufficiency, hepatic insufficiency, infectious diseases;
Haemorrhoidal outbreaks;
Capillary fragility in the course of treatment by anticoagulants.

II.—Abnormally high capillary permeability

Edema of the legs, "heavy legs";
Various conditions, varicose ulcers;
Sequels of phlebitis;
Edema of premature infants;
Edema of hepatic insufficiency;
Pleural effusions of cardiac cases;
Pleurisy;
Periarthritis;
Allergic accidents (urticaria, eczema, Quincke's edema, dyshidrosis);
Dermatosis (pemphigus, psoriasis);
Cellulitis.

The new medicine may be administered internally, that is to say orally or in the form of suppositories or parenterally, but not by intravenous administration. The posology utilised per os may range from 5 to 10 mg. per 24 hours. Tetrahydroxy 5,7,3',4' flavan 3,4-diol may also be applied externally in any known manner.

The advantages of the utilisation of tetrahydroxy 5,7,3',4'-flavan 3,4-diol in human therapeutics, as compared with other hydroxyflavan diols, arise from the properties of the new compound used as an active product, that is to say essentially:

Excellent solubility in water, unlike certain other vitamin P factors;
Good storage properties;
More intense vascular action than that of the usual bioflavanoids;
Absence of toxicity: this is a natural product present in numerous vegetable foodstuffs;
Easy chemical control through a sensitive and specific determination technique.

With regard to the efficacy of the new product having the above formula, the following will be noted:

The discovery of capillary permeability factors is due to Szent Gyorgyi in 1936. They are natural substances normally present in our diet, permitting efficient functioning of capillar blood vessels by reducing their fragility.

The capillary circulation, which assumes the heavy task of maintaining the cellular metabolism, is able to act efficiently in accordance with two apparently mutually contradictory properties of capillary vessels; Resistance and Permeability.

Resistance.—The blood fluid must be retained; apart from leucocytary diapedesis, it is necessary to prevent any loss of fluid.

Permeability.—The blood must perform its essential function of transporting to the tissues all substances necessary for the nutrition of its cells.

Numerous pathological states are known to be characterized by capillary fragility: decreasing resistance produces spontaneous haemorrhages, while increasing permeability allows the formation of edemas and various exudates. Such syndromes generally disappear with the administration of various substances of vegetable origin belonging to the polyphenol group: e.g., Szent Gyorgi's citrin, rutin, hesperidin, and epicatechin. The therapeutic action of the lemon extracts first used by Szent Gyorgyi was so marked that the presence of another vitamin was suspected, and it was called "Vitamin P" or "vascular permeability factor." In fact, the presence of any vitaminic substance has not been proven in humans and the designation "bioflavanoid" has been substituted for the first one. However, in Europe, such physiologically active agents are often referred to as "facteur vitaminique P."

Of all the substances tested, epicatechin is reported to be most active. In 1942, Lavollay reported that guinea pigs show a reaction following an intraperitoneal injection of 0.001 mg. of the factor; doses of up to 500 or 1000 times greater of other bioflavanoids are necessary to produce the same reaction. Unfortunately, due to their instability catechin factors cannot be used for therapeutic purposes. However, there exists a group of natural substances, of vegetable origin, having a close chemical link with catechin; these are "Hydroxyflavandiols." Catechins are hydroxyflavan 3-ols, while these substances are hydroflavan 3,4-diols.

Clinical test carried out with 5 mg. tablets have given the following results, which show the increase in capillary resistance (C.R.); the measurements of the C.R. were made with Parrot's angiosterrometer in subclavicle area.

Miss J.T.—30 years
Initial C.R. 30
Posology: 2 tablets
C.R. after 24 hours: 36
Augmentation: 20%

Mrs. N.D.—40 years
Initial C.R. 30
Posology: 1 tablet
C.R. after 24 hours: 37
Augmentation: 23%

Mrs. L.B.—56 years
Initial C.R. 20
Posology: 2 tablets
C.R. after 24 hours: 30
Augmentation: 50%

Mrs. L.D.—39 years
Initial C.R. 20
Posology: 1 tablet
C.R. after 24 hours: 30
Augmentation: 50%

Mrs. J.M.—42 years
Initial C.R.–25
Posology: 2 tablets
C.R. after 24 hours: 40
Augmentation: 60%

Mrs. M.L.P.—41 years
Initial C.R. 19
Posology: 2 tablets
C.R. after 24 hours: 26
Augmentation: 36%

Mrs. P.F.—34 years
Initial C.R. 25
Posology: 1 tablet
C.R. after 24 hours: 35
Augmentation: 40%

The above indications clearly show the advantage of the new medicament.

What is claimed is:

1. A method of producing hydroxyflavan 3,4-diols from vegetable materials comprising the steps of:
   treating said material with an aqueous solution of sodium chloride;
   separating aqueous solution from the solid impurities;
   extracting said aqueous solution with ethyl acetate to obtain a solution of hydroxyflavan 3,4-diols in ethyl acetate;
   treating said solution in ethyl acetate with an excess of chloroform;
   separating the precipitated hydroxyflavan 3,4-diols;
   purifying said hydroxyflavan 3,4-diols in a plurality of stages each consisting of solution in ethyl acetate followed by precipitation from solution by addition of chloroform.

2. A method according to claim 1 wherein the vegetable material is selected from the group consisting of groundnuts and pine bark.

3. A method according to claim 1, wherein the vegetable material is first subjected to purification by an organic liquid in which the hydroxyflavan 3,4-diols are insoluble.

4. A method according to claim 1 wherein the vegetable material is first extracted with an organic solvent which is subsequently driven off by evaporation and the residue treated with aqueous sodium chloride.

5. A method according to claim 4 wherein the organic solvent is an alcohol.

6. A method according to claim 5 wherein the alcohol is selected from the group consisting of methanol, ethanol, and isopropanol.

7. A method according to claim 1 wherein the ethyl acetate solution is concentrated by evaporation prior to treatment with chloroform.

8. A method according to claim 1 wherein the less, condensed forms of the hydroxyflavan 3,4-diols are isolated with the exclusion of tannins and phlobaphenes.

9. A method according to claim 1 wherein the aqueous solution of sodium chloride is saturated.

10. A method according to claim 1 wherein the treatment of the vegetable material with the aqueous solution of sodium chloride is carried out at about 100° C. for about 1 hour.

11. A method according to claim 1 wherein the hydroxyflavan 3,4-diol is tetrahydroxy 5,7,3′,4′-flavan-3,4-diol.

12. A method of producing hydroxyflavan 3,4-diol from vegetable materials comprising the steps of:
   subjecting the vegetable material to purification by an organic liquid in which the hydroxyflavan 3,4-diols are insoluble;
   extracting the vegetable material with an organic solvent which is subsequently driven off by evaporation and the residue treated with aqueous sodium chloride;
   treating said material with a saturated aqueous solution of sodium chloride;
   separating the resulting aqueous solution from the solid impurities;
   extracting said aqueous solution with ethyl acetate to obtain a solution of the hydroxyflavan 3,4-diols in ethyl acetate;

concentrating said ethyl acetate solution by evaporation;

purifying said hydroxyflavan 3,4-diols by a plurality of stages each consisting of solution in ethyl acetate followed by precipitation from solution by addition of chloroform.

References Cited

UNITED STATES PATENTS

| | | | |
|---|---|---|---|
| 2,744,919 | 5/1956 | Kurth | 260—345.2 |
| 2,870,165 | 1/1959 | Hergert | 260—345.2 |
| 3,131,198 | 4/1964 | Esterer et al. | 260—345.2 |
| 3,266,903 | 8/1966 | Jurd | 260—345.2 XR |

OTHER REFERENCES

Geissman: "The Chemistry of Flavonoid Compounds," The Macmillan Co., New York (1962), pp. 456–9.

HENRY R. JILES, *Primary Examiner.*

J. M. FORD, *Assistant Examiner.*

U.S. Cl. X.R.

260—999